Dec. 26, 1939.  H. B. DRAPEAU  2,184,291
VALVE FOR ENGINE TEMPERATURE CONTROL
Filed May 7, 1937
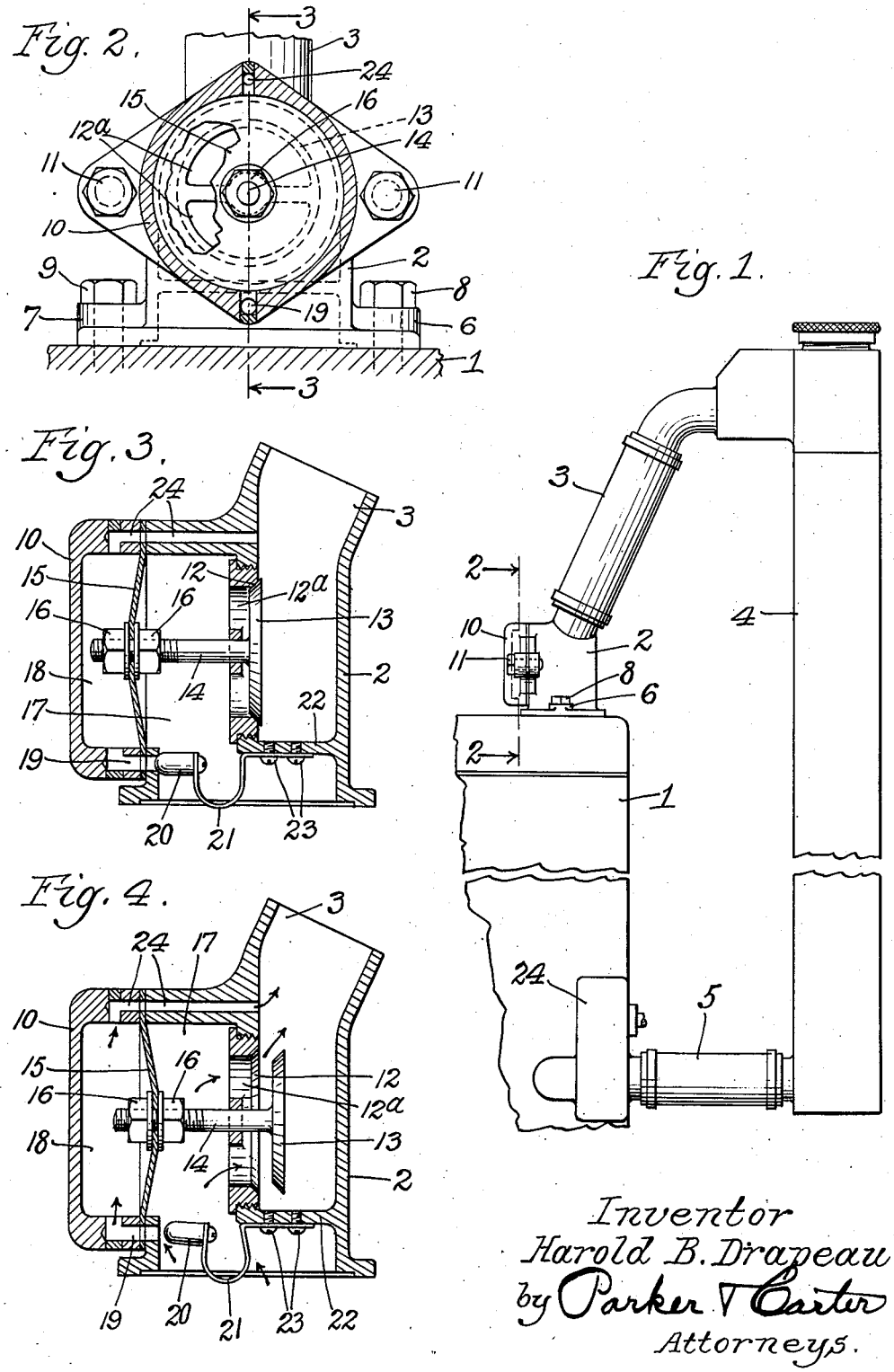
Inventor
Harold B. Drapeau
by Parker & Carter
Attorneys.

Patented Dec. 26, 1939

2,184,291

UNITED STATES PATENT OFFICE 2,184,291

VALVE FOR ENGINE TEMPERATURE CONTROL

Harold B. Drapeau, Oak Park, Ill., assignor to The Dole Valve Company, Chicago, Ill., a corporation of Illinois Application May 7, 1937, Serial No. 141,325

10 Claims. (Cl. 123—178)

This invention relates to valves for engine temperature control and has for its object to provide a new and improved device of this description. The invention has as a further object to provide a valve for engine temperature control particularly adapted for use in controlling engine temperatures where the pump pressure in the engine cooling system is high. The invention has as a further object to provide a valve for engine temperature control wherein there is combined a thermostat and a pressure actuated device such as a diaphragm. The invention has as a further object to provide a valve for engine temperature control wherein the valve is moved by the pressure of the liquid in the engine cooling system. The invention has as a further object to provide a valve for engine temperature control wherein the valve is moved by the pressure of the liquid in the engine cooling system, such pressure being controlled and regulated by a thermostat.

The invention has as a further object to provide a valve for engine temperature control wherein the valve performance is regulated purely by temperature, regardless of pressure fluctuations. The invention has as a further object to provide a valve for engine temperature control wherein the complete temperature control is secured with the smallest practical size thermostat.

The invention has as a further object to provide a valve for engine temperature control which permits the valve to move to a safe open position in case of failure of either diaphragm or thermostat. The invention has as a further object to provide a valve for engine temperature control which permits the use of an inexpensive thermostat for high pressure installations. The invention has other objects which are more particularly pointed out in the accompanying description.

Referring now to the drawing,

Fig. 1 is a view showing one form of the device in position in an engine cooling system;

Fig. 2 is an enlarged sectional view taken on line 2—2 of Fig. 1;

Fig. 3 is a sectional view taken on line 3—3 of Fig. 2; and

Fig. 4 is a view similar to Fig. 3, showing the valve open.

Like numerals refer to like parts throughout the several figures.

The device is applicable to systems where the liquid is circulated by means of a pump or by any other means, such as thermo-syphon means.

Referring now to the drawing, 1 designates the engine cooling jacket of an internal combustion engine, having an outlet casting 2 for the cooling liquid, which acts as a casing for the valve. This casting is connected by a pipe 3 with the radiator 4, the radiator being connected by a pipe 5 with the cooling jacket of the engine. The outlet casting 2 forms the casing of the valve and it may be of any desired form or construction. In the particular construction illustrated, the casing is provided with lateral members 6 and 7 which are connected to the engine by the fastening devices 8 and 9. There is preferably a removable cap 10 for the casing which is fastened in position by the fastening devices 11. The lower end of the casing 2 is open, so that the casing communicates with the water jacket of the engine. Within the casing 2 is a valve seat 12 which is preferably removable and which as shown has a threaded engagement with a threaded opening in the casing. There is a port 12a which is controlled by the main valve 13, cooperating with said valve seat 12 and which has a stem 14 which is attached to a pressure actuated device 15, which as herein shown is a diaphragm, in any desired manner. This stem is preferably adjustably attached to the diaphragm by means of the nuts 16 on the threaded end of the stem, the diaphragm being held between these nuts. The diaphragm 15 divides the casing in front of the valve into two chambers 17 and 18. By means of this construction the friction is minimized. The passageway 19 connects the chambers 17 and 18. This passageway is controlled by an auxiliary valve, which is illustrated as a thermostatically controlled valve 20 connected with the thermostat 21, which may be supported in any desired manner. As herein shown, this thermostat is attached to the wall 22 of the casing by the fastening devices 23. The casing is also provided with a passageway 24 which leads from the chamber 18 to a point on the other side of the valve 13, in this instance being shown as connected with the pipe 3.

I have described in detail a particular construction embodying the invention, but it is of course evident that the parts may be varied in many particulars without departing from the spirit of the invention as embodied in the claims hereto appended, and I therefore do not limit myself to the particular construction shown.

It will be noted that in the construction illustrated there is a casing with an inlet 2 and an outlet 3 and a wall extending across the casing intermediate the inlet and the outlet which is provided with a port which connects the inlet with the outlet. There is a valve controlling this port. A pressure actuated device is connected with the valve so as to control it and which extends across the casing, dividing the interior at one side of said valve into two chambers. The surface area of this diaphragm is greater than the surface area of the valve and there is a connection between each of said chambers and the inlet, and a thermostatically controlled valve for controlling one of said connections, the arrangement being such that the thermostat is not used to move the valve, but the movement of the valve is secured by the pressure within the casing, that is by the difference in pressure on the two sides of the diaphragm, and this difference in pressure is regulated or brought about by the action of the thermostat.

The use and operation of my invention are as follows.

One of the purposes of this invention is to provide a construction where there is no bypass, so that the engine will heat up quickly. When the cooling liquid used for cooling the engine is cool, for example, the parts are in the position shown in Fig. 3. In this position the valves 13 and 20 are closed. This means that when the engine is started up, for example, there is no circulation of the cooling liquid through the radiator.

When the valve is in position as illustrated in Fig. 1 and the engine is first started up, the thermostatically controlled valve 20 is in its closed position, as shown in Fig. 3, closing the passageway 19. This creates an unbalanced pressure between the front and back faces of the diaphragm 15, causing the pressure of the liquid, due to the operation of the pump 24, to be greater on the side of the diaphragm nearest the valve 13 than on the other side, and this holds the valve 13 in its closed position, regardless of and independent of pressure variations. As the engine warms up and the temperature of the liquid contacting with the thermostat 21 rises to the predetermined warming up temperature, the valve 20 is opened. This permits the liquid to pass through passageway 19 into chamber 18, thereby admitting pressure to the side of the diaphragm farthest from the valve 13. When this pressure reaches a predetermined amount, the pressure on the face of the valve 13 acts to open this valve and permits the liquid to pass from the engine jacket through the port 12a into the pipe 3 and thence into the radiator 4, so that the liquid then circulates through the engine cooling system. As the engine operates the cooling liquid in the jacket gets hot quickly and therefore acts to quickly heat the engine. Since the radiator at the upper end is open to atmospheric air, the pressure, when the pump is running and the valve 13 is open, is greater at the pump than at the thermostatic valve and is less in the pipe 3 than at the pump. The valve 13 is opened on the following conditions. When the motor is cold and first started up, the thermostatic valve 20 is closed. The water from the pump therefore enters the chamber 17 but not the chamber 18. The area of the diaphragm 15 is greater than that of the opposed face of the valve 13 and consequently will have a greater pressure on it and will hold the valve 13 closed. When the temperature rises sufficiently, the thermostat 21 opens the valve 20 and the liquid enters the chamber 18 so that there is a pressure on the lefthand side of the diaphragm 15 equal to that on the righthand side. This would mean a balanced condition except for the fact that there is pressure on the face of the valve 13 opposed to the diaphragm 15, tending to open the valve. Since the pressures on the two sides of the diaphragm 15 have now become equalized, the diaphragm does not oppose the opening of the valve 13 and this pressure on the face of the valve 13 causes it to open, as shown in Fig. 4.

When the temperature again lowers, the thermostatic valve 20 is again closed. This shuts off the pressure from the chamber 18, but continues the pressure in the chamber 17. The pressure in the chamber 18 has been relieved through the passageway 24, due to the fact, as before stated, that the radiator at the upper end is open to atmospheric pressure. The pressure, therefore, on the right side of the diaphragm will be greater than the pressure on the left side of the valve 13 and the valve 13 will be closed.

It will thus be seen that as long as the temperature remains above a predetermined amount, the valve 20 will remain open and the cooling liquid be circulated through the radiator and the engine jacket. When the engine is stopped and the temperature of the liquid falls below a predetermined amount, the valve 20 is then closed by the thermostat, so that the device is ready to warm up the engine when the engine is started, before the liquid will be circulated through the radiator. It will be seen that by means of this device all that is required to do is to move a small valve 20 to open and close the passageway 19 and that the main valve 13, which controls the passage of the liquid between the engine jacket and the radiator, is entirely controlled and opened and closed by the pressure of the liquid itself.

It will further be noted that since the thermostat is not required to move the valve, there is no impeding friction which it must overcome. It will further be noted that the friction is minimized in connection with the movement of the valve 13. The device is responsive to changes of speed as well as changes of pressure.

I claim:

1. A valve for engine temperature control comprising a casing having an inlet and an outlet, a wall extending across said casing intermediate the inlet and the outlet and provided with a port which connects the inlet with the outlet, a valve for controlling said port, a pressure actuated device connected with said valve and dividing the interior of the casing at one side of said valve into two chambers, a connection between each of said chambers and said inlet, and a thermostatically controlled valve for controlling one of said connections.

2. A valve for engine temperature control comprising a casing having an inlet and an outlet, a wall extending across said casing intermediate the inlet and the outlet and provided with a port which connects the inlet with the outlet, a valve for controlling said port, a pressure actuated device connected with said valve and dividing the interior of the casing at one side of said valve into two chambers, the surface area of the pressure actuated device being greater than the surface area of said valve, a connection between each of said chambers and said inlet, and a thermostatically controlled valve for controlling one of said connections.

3. A valve for engine temperature control comprising a casing having an inlet and an outlet, a wall extending across said casing intermediate the inlet and the outlet and provided with a port which connects the inlet with the outlet, a valve for controlling said port, a diaphragm connected with said valve and extending across the casing and dividing the interior of the casing at one side of said valve into two chambers, the surface area of the diaphragm being greater than the surface area of said valve, means for applying unequal pressure on opposite sides of said diaphragm when the engine is first started up, so as to maintain said valve closed, and means for equalizing the pressure on opposite sides of said diaphragm after the engine has been running for a short time, to cause it to move to open said valve.

4. A valve for engine temperature control comprising a casing having an inlet and an outlet, a wall extending across said casing intermediate the inlet and the outlet and provided with a port which connects the inlet with the outlet, a valve for controlling said port, a diaphragm connected with said valve and extending across the casing and dividing the interior of the casting at one side of said valve into two chambers, the surface area of the diaphragm being greater than the surface area of said valve, means for applying unequal pressure on opposite sides of said diaphragm when the engine is first started up, so as to maintain said valve closed, and means responsive to the temperature of the liquid in said casing, for equalizing the pressure on opposite sides of said diaphragm after the engine has been running for a short time, to cause it to move to open said valve.

5. A valve for engine cooling systems comprising a casing having an inlet and an outlet for the flow of cooling liquid, a wall extending across the casing intermediate the inlet and the outlet, said wall having a port therethrough which connects the inlet with the outlet, a valve for controlling said port, a diaphragm within said casing with which said valve is connected, and means for opening and closing said valve by the pressure upon said diaphragm of the liquid controlled by said valve and passing through said casing.

6. A valve for engine cooling systems comprising a casing having an inlet and an outlet for the flow of cooling material, a wall extending across the casing intermediate the inlet and the outlet and provided with a port which connects the inlet and the outlet, a valve for controlling said port, and means inside the casing, in contact with the material in the casing and responsive to pressure in the casing for actuating said valve to open and close said port.

7. A valve for engine temperature control comprising a casing having an inlet and an outlet, a wall extending across the casing intermediate the inlet and the outlet and provided with a port which connects the inlet and the outlet, a valve for controlling said port, means responsive to pressure in the casing for actuating said valve to open and close said port, and thermostatically controlled means for controlling said pressure so as to cause the valve to be actuated.

8. A valve for engine temperature control comprising a casing adapted to be placed in the cooling system of the engine, having an inlet and an outlet, a wall extending across the casing intermediate the inlet and the outlet and provided with a port which connects the inlet and the outlet, a valve for controlling said port, means responsive to pressure in the casing for actuating said valve to open and close said port, and thermostatically controlled means for controlling said pressure so as to cause the valve to be actuated.

9. A valve for engine temperature control comprising a casing having an inlet and an outlet, a wall extending across said casing intermediate the inlet and the outlet and provided with a port which connects the inlet with the outlet, a valve for controlling said port, a diaphragm connected with said valve and extending across the casing and dividing the interior of the casing at one side of said valve into two chambers, the surface area of the diaphragm being greater than the surface area of said valve, two connections between said inlet and said outlet, one extending on one side of the diaphragm and the other on the other side of the diaphragm,, and a thermostatically controlled valve for controlling one of said connections.

10. A valve for engine temperature control comprising a casing having an inlet and an outlet, two connections between said inlet and said outlet, a valve for controlling one of said connections responsive to variations in temperature in the casing and a valve for controlling the other connection responsive to pressure in the casing.

HAROLD B. DRAPEAU.